Figure 1:
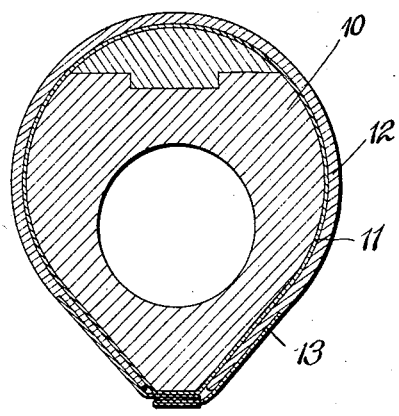

R. M. MERRIMAN.
METHOD OF BUILDING CORD TIRES.
APPLICATION FILED JULY 19, 1916.

1,219,835.

Patented Mar. 20, 1917.
2 SHEETS—SHEET 1.

Inventor
R. M. Merriman,

By
[signature], Attorneys.

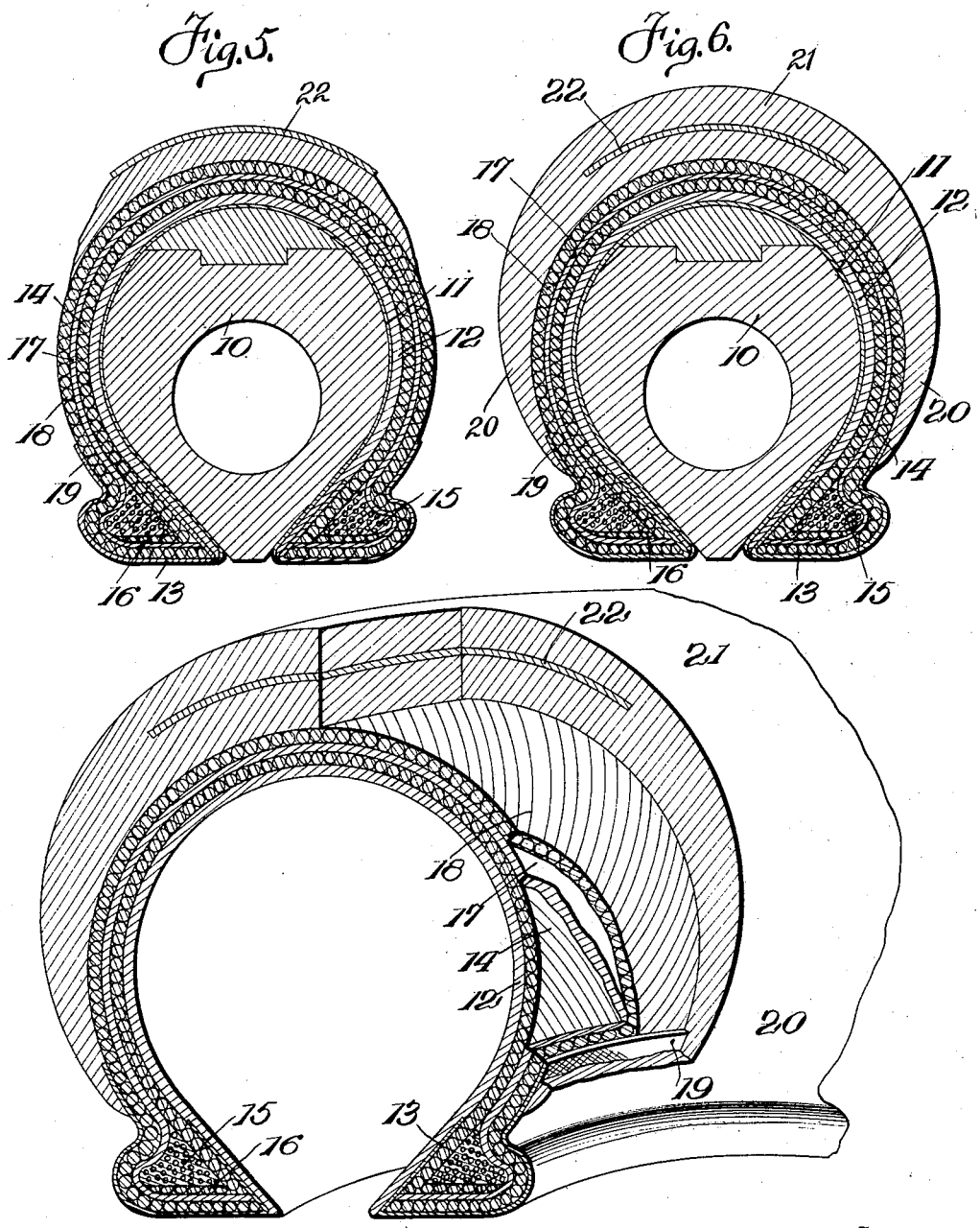

UNITED STATES PATENT OFFICE.

ROBERT M. MERRIMAN, OF AKRON, OHIO.

METHOD OF BUILDING CORD TIRES.

1,219,835.  Specification of Letters Patent.  Patented Mar. 20, 1917.

Application filed July 19, 1916. Serial No. 110,105.

*To all whom it may concern:*

Be it known that I, ROBERT M. MERRIMAN, a citizen of the United States, residing at Akron, in the county of Summit and State of Ohio, have invented certain new and useful Improvements in Methods of Building Cord Tires, of which the following is a specification.

My invention relates to new and useful improvements in the casings of pneumatic tires and more particularly to that type known as cord tires, the primary object of my invention being the provision of an improved and superior method of tire construction.

In the manufacture of cord tires, under present methods, particular types of beads and, in some instances, cores are required and the cords are not properly or effectively anchored in the bead portions of the finished tire. One of the objects of my invention consists in the provision of a method of tire manufacture in which the inner ply of cords may be wound spirally about the core, the beads applied and the convolutions of the inner ply of cord cut along the center line of the inside of the core and the resultant ends turned out beneath and against the under faces of the beads.

Another object which I have in view in carrying out my method consists in providing the tire with a second outer ply of cord which is wound about the core and also about the beads and which is then cut along the inner edges of the beads so that the two plies together reinforce all portions of the beads and so that the free ends of the outer ply overlap the free ends of the inner ply to give double strength to the inner portions of the beads.

With these and other objects in view, my invention will be more fully described, illustrated in the accompanying drawings, and then specifically pointed out in the claims which are attached to and form a part of this application.

Figure 2:
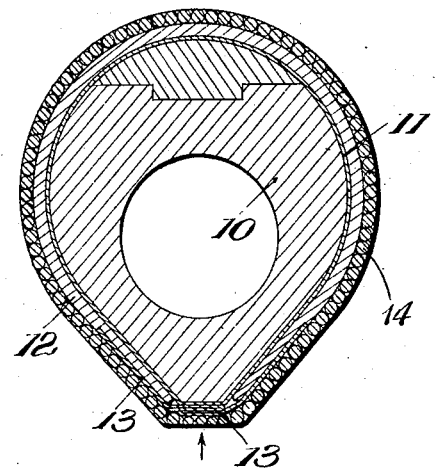
Figure 3:
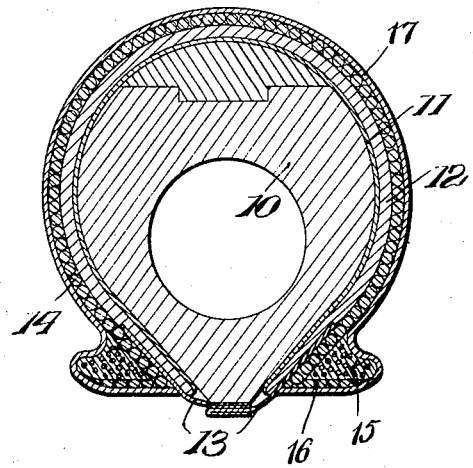
Figure 4:
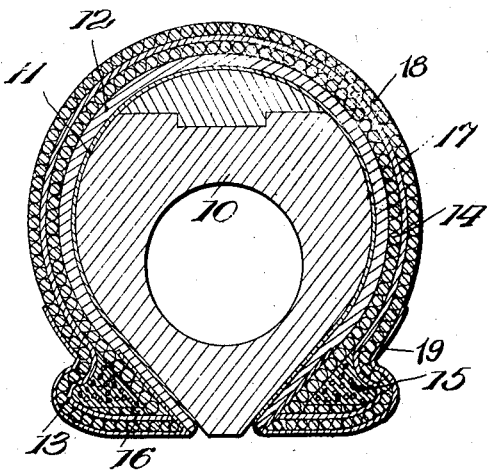

In the drawings:

Figures 1 to 6 inclusive are transverse sectional views taken radially of a core, showing successive steps in the construction of a tire in accordance with my improved method;

Fig. 7 is a perspective view of a section of tire so constructed, parts being broken away to show certain features in construction which could not well be shown in the other views.

Corresponding and like parts are referred to in the following description and indicated in all the views of the drawings by the same reference characters.

Although I have illustrated the manufacture of my tire in connection with a specific type of collapsible core 10 it will be understood that any suitable type of core may be employed. In constructing the tire I first coat the core with cement, as shown at 11, and then with a layer of pure gum 12. The thickness of this layer of gum may vary according to the size of the tire being generally approximately one-sixteenth of an inch, although this thickness may be increased or decreased at the discretion of the manufacturer. I then apply strips or plies of fabric 13, one to each side of the core, these strips at their outer edges extending outwardly along the side walls of the core to any preferred distance and at their inner edges extending a sufficient distance to form a reinforcing covering for the completed beads of the tire and to project somewhat into the outer side walls of the tire when the latter is completed. At first these free edges are, however, folded in somewhat the manner shown in Figs. 1 to 3 of the drawings in order to be out of the way.

About the tire thus far constructed, I then wind a ply of cord 14 of any suitable character and size. This ply of cord is wound around and around the entire core in a helical direction so that its convolutions extend across the tread portion of the tire at an angle of substantially 45 degrees, these convolutions of course abutting against each other throughout the entire circumference of the tire. When this inner ply of cord has been applied, in the manner described, the beads 15, which may be of any suitable type and formed of rubber or fabric reinforced by wire, and endless, if preferred, are applied. After the beads are set, the convolutions of the inner ply of cord are cut along the center line of the inside of the core, as indicated by the arrow in Fig. 2, and the free ends of the cord sections thus formed are turned outwardly to bear against the lower or inner faces of the beads, as clearly shown at 16 in Fig. 3.

After this has been done, a relatively thin coating or ply 17 of gum is applied about the entire tire and beads when a second ply of cords 18 is wound about the thus far completed tire. This second or outer ply of cord is wound completely about the core or partially completed tire in the same manner as the first, with the single exception that its convolutions, while extending at substantially an angle of 45 degrees, extend also at substantially right angles to the first ply, this being shown in Fig. 7. When this second or outer ply of cord has been applied, its convolutions are doubly cut along the side edges of the inside of the core and the freed sections along the inside of the core removed so that the free ends of the remaining sections abut against the outer faces of the fabric strips 13 and are practically in alinement with the portions of the inner cord ply just inside the beads. The free edges of the fabric strips 13 are then turned outwardly and formed about the beads, as indicated at 19, to reinforce the beads and to insure proper anchoring of the ends of the cord sections. These strips, therefore, not only serve to reinforce the inner wall of the tire adjacent the bead portions, but also form bead strips.

Pure gum is then applied about the tire to build the side walls 20 and tread 21 in the usual manner, a breaker strip 22 extending circumferentially of the tire being embedded in this gum. When the tire has been built up in the above described manner, it is then ready to be vulcanized, cured and otherwise treated in the usual manner followed in constructing tires of this character.

Obviously, the weight of the fabric strips employed, the thicknesses of the various layers or plies of gum and the size of the cords, as well as the material of which they are formed and the type of beads used may be varied at the discretion of the manufacturer and to suit the size of tire being made. Furthermore, the same system may be followed in constructing either clencher, straight side or quick detachable tires without in the slightest degree departing from the spirit of my invention. A tire constructed in this manner is extremely durable, due to the fact that the beads are entirely surrounded by the ends of the cord plies and to the further fact that the ends of the cord plies overlap along the beads and are anchored by the bead strips which are passed about them and the free edges of which are embedded in the inner gum ply and outer gum ply of the tire or casing.

Having thus described the invention, what is claimed as new is:

1. The method of building up a tire casing upon its core, which consists in coating the core with cement, in applying a ply of gum to the core, in applying fabric strips to the inner side portions of the core with their free edges folded upon themselves against the inner face of the core, in applying an inner ply of cord about the ply of gum, the cord being wound about the core, in setting beads in place at the sides of the core, in severing the convolutions of the cord along the center line of the inner face of the core, and in folding the resultant ends of the cord sections outwardly against the bases of the beads, in applying a second ply of gum about the tire thus far formed, in winding a second outer ply of cord about the second ply of gum, in doubly severing the convolutions of the second ply of cord along the side lines of the inner face of the core, in unfolding the free edges of the fabric strips and in turning them outwardly about the bead portions of the tire thus far formed, and in then applying side walls and tread portions.

2. The step in the building up of a tire casing about its core which consists in winding a single ply of cord completely about the core, in applying beads to the lower side portions of the part of the tire thus far formed, in severing the convolutions of the cord ply along the center line of the inner face of the core and folding the free ends of the cord sections thus formed outwardly against the bases of the beads and terminating the ends of the cord sections substantially at the outer edges of the beads, in appying a ply of gum about the inner cord ply, and in winding a second cord ply over the ply of gum and beads, in severing the convolutions of the second cord ply in line with the side edges of the inner face of the core and forming the severed ends about the beads to bear against their inner faces and terminate at their inner edges.

3. The method of building up a tire casing upon its core, which consists in applying fabric strips to the inner side portions of the core with their free edges folded upon themselves against the inner face of the core, in winding plies of cord about the core with the strands of one ply extending at an angle to the strands of an adjacent ply, in positioning beads between certain of the plies and severing the plies and forming their ends about the beads, in unfolding the free edges of the fabric strips and turning them outwardly about the beads thus far formed, and in then applying side wall and tread portions.

In testimony whereof I affix my signature.

ROBERT M. MERRIMAN. [L. S.]